June 13, 1967 C. E. ANDERSON 3,324,741
VALVE OPERATOR

Filed June 15, 1965 3 Sheets-Sheet 1

INVENTOR.
CLIFFORD E. ANDERSON
BY
AGENT

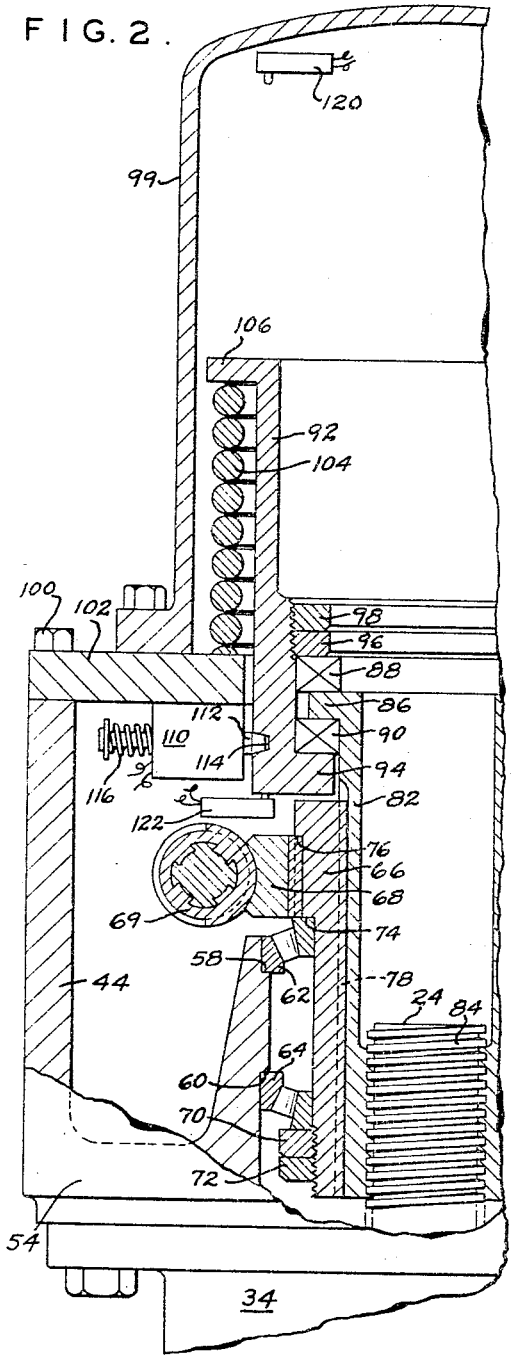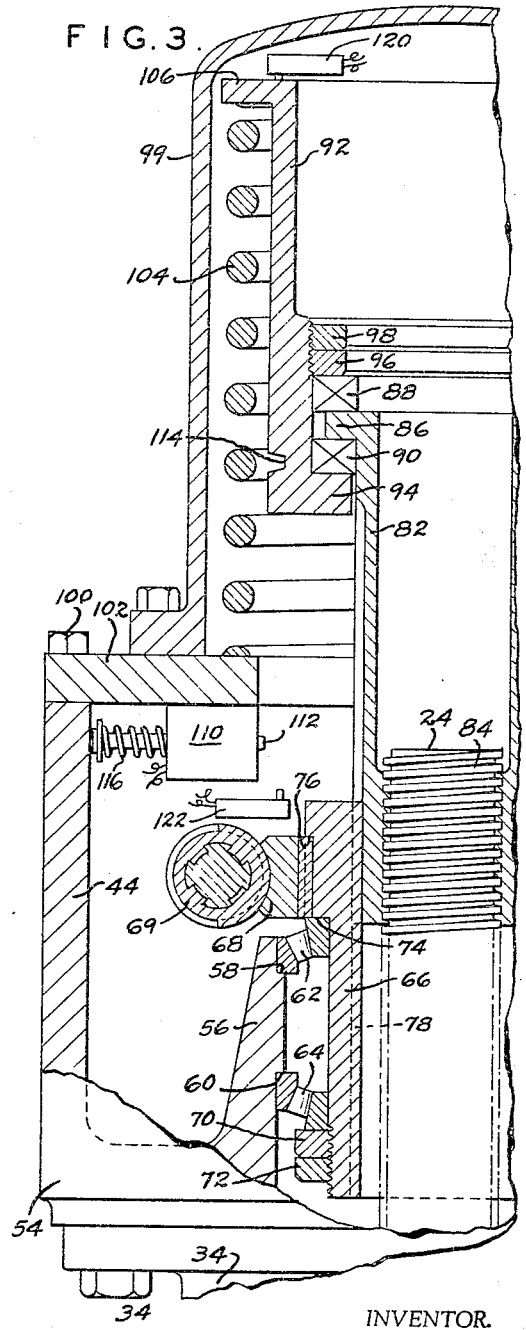

June 13, 1967    C. E. ANDERSON    3,324,741
VALVE OPERATOR

Filed June 15, 1965    3 Sheets-Sheet 3

INVENTOR.
CLIFFORD E. ANDERSON
BY
*James D. Jackson*
AGENT

United States Patent Office 3,324,741
Patented June 13, 1967

3,324,741
VALVE OPERATOR
Clifford E. Anderson, Houston, Tex., assignor to ACF Industries, Incorporated, New York, N.Y., a corporation of New Jersey
Filed June 15, 1965, Ser. No. 464,070
11 Claims. (Cl. 74—625)

This application is directed generally to the control of remotely located mechanical apparatus, and more specifically to the control of remotely located underwater mechanical devices by electrically controlled and energized power operator devices.

Hydraulic and electric power operators have been used extensively in the past to control mechanical devices, for example, oilfield valves for wellhead assembles, pipelines, etc. The art, therefore, concerning hydraulic and electric operators for surface valves is quite well developed. Recent activity, however, in drilling offshore oil wells has required the development of valve operating structures which can be positioned under water to control the valves of wellhead assemblies or valves of undersea pipelines. Hydraulic operators for undersea service have been previously developed and are utilized almost exclusively for the control of undersea mechanical apparatus such as valves.

A disadvantage involved in the use of hydraulically energized undersea control apparatus concerns the amount of hydraulic piping necessary for conducting hydraulic fluid to the remotely located hydraulic operator in sufficient pressure ranges for the expedient operation of the hydraulic operator. It has been roughly estimated that hydraulic fluid lines for energizing a remotely located power operator must be at least one inch in diameter for every mile of distance due to the pressure loss from friction between the line and the hydraulic fluid. For example, it is estimated that hydraulic piping for a mechanical device located five miles from the source of hydraulic control would require hydraulic piping at least five inches in diameter. The cost of double line hydraulic piping for control of such a remotely located undersea device could be exceedingly expensive.

An important disadvantage in the past in considering the employment of submerged electric remotely controlled operators for controlling submerged mechanical apparatus lies in the fact that there has not been provided heretofore a "fail-safe" construction for electric operators which is operative in response to specific predetermined conditions for insuring movement of the mechanical device to a safe position. For example, if an electrically energized submerged operator should become rendered inoperative, such as by failure of the source of electrical energy controlling the same, there would be no provision for movement of the power operated device being operated to a safe position. In the case of power operated valves for controlling the flow of petroleum and gas from wellhead assemblies, this can be a serious problem because a wellhead assembly or its related flow systems may become severely damaged or even destroyed by excessive or uncontrolled pressures from the wellhead.

Accordingly, it is a primary object of this invention to provide a novel fail-safe electrically energized power operator for controlling remotely located mechanical devices.

It is a further object of this invention to provide a novel electrically energized power operator, including means for moving a mechanical device to a safe position either manually by controlling the electrical circuitry or automatically should a dangerous condition arise.

An even further object of this invention contemplates the provision of a novel electrically energized power operator construction, which may be submerged in sea water or the like for extended periods of time.

It is an even further object of this invention to provide a novel electrically energized power operator construction, including mechanical means for manually operating the control device if desired.

It is an even further object of this invention to provide a novel fail-safe electrically energized power operator construction, which is inexpensive in contruction and reliable in use.

Briefly, the invention concerns a submersible power operator construction which is affixed to the mechanical device for which operation is desired, for example, a valve for a wellhead assembly, and which is driven by an electrically energized motor for imparting controlling movement to a desired portion of the mechanical device. An electrically controlled mechanical system is provided for selectively or automatically moving the mechanical device to its safe position in response to specific predetermined conditions, such as selective de-energization or failure of the electrical circuitry for operation of the power opeartor. The power operator is also provided with a mechanical override construction for allowing manual positioning of the operator, if this should become necessary. Mechanism is also provided to recompress the fail-safe spring and to latch it in place with controls at the remote control station. It is intended that the operation of this unit will be as effective and useful on unsubmerged installations as or submerged locations.

Other and further objects of the invention will become obvious upon an understanding of the illustrated embodiments about to be described or will be indicated in the appended claims, and various advantages not referred to herein will become apparent to one skilled in the art upon employment of the invention in practice.

Preferred embodiments of the invention have been chosen for purpose of illustration and description and are shown in the accompanying drawings forming a part of the specification wherein:

FIGURE 2 is a partial section view of the electrically energized power operator of FIGURE 1.

FIGURE 3 is a sectional view of the operator of FIGURE 2, illustrating operation of the fail-safe mechanism upon de-energization of the electrical circuitry thereof.

Figure 1:
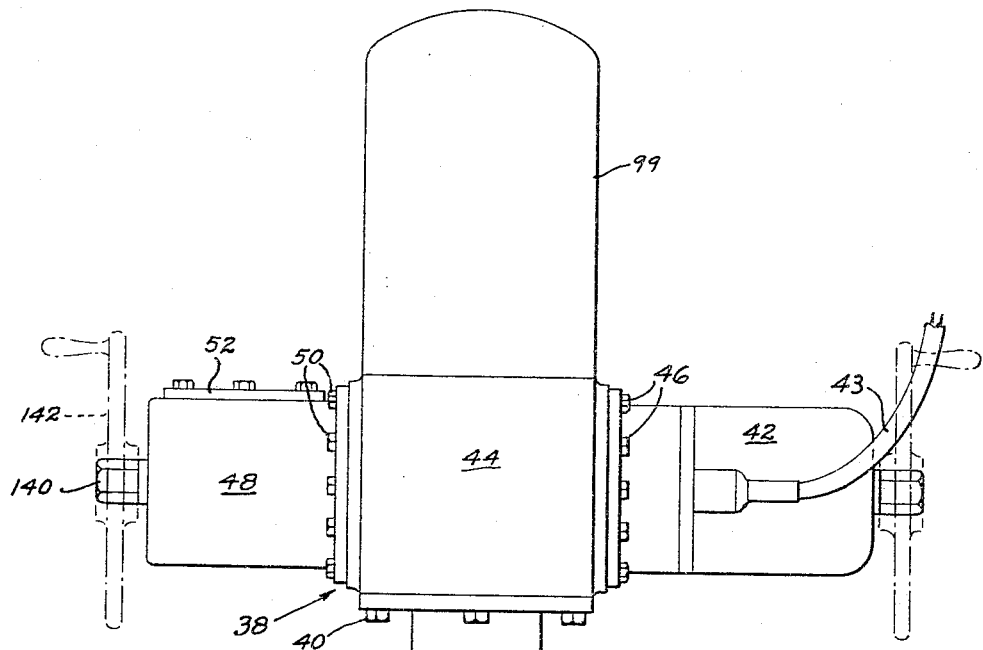
FIGURE 1 is a partial sectional view in elevation illustrating a gate valve provided with an electrically energized power operator constructed in accordance with the spirit of this invention.
Figure 4:
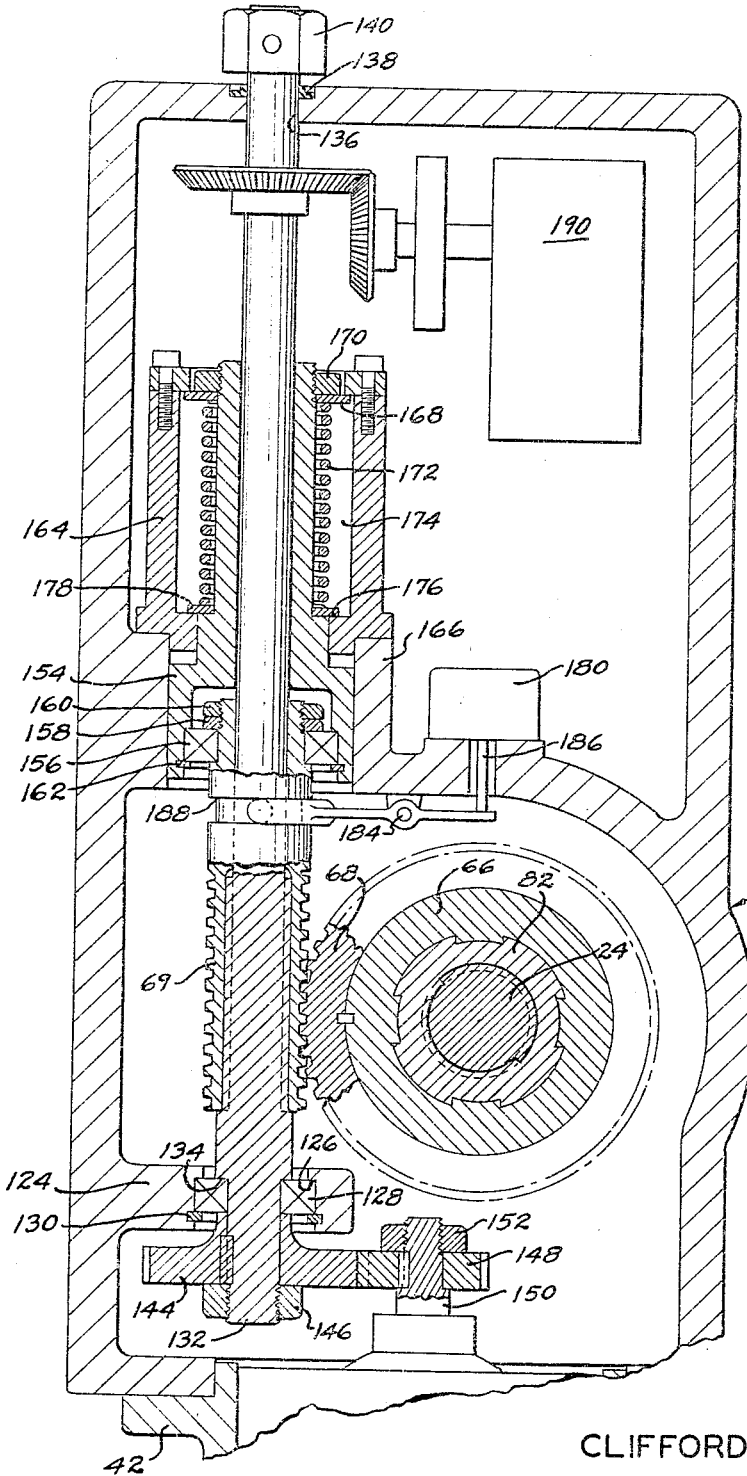
FIGURE 4 is a sectional view of the operator of FIGURE 1, illustrating the torque switch operating construction.

Referring now to the drawings for a better understanding of the invention, in FIGURE 1 is disclosed a valve 10 having a valve body 12 with aligned flow passages 14 formed therein for allowing the flow of fluid through the valve. Intersecting the flow passages 14 is a valve chamber 16, in which is positioned a reciprocating valve member 18. The valve member 18 has a passage 20 formed therein, which in the open position of the valve is aligned with the flow passages 14 forming a smooth conduit for the uninterrupted flow of fluid therethrough, and a solid portion 19, which in the closed position of the valve cooperates with a seat member to block the flow of fluid through the flow passages 14. The valve 18 is reciprocated for controlling the flow of fluid through the valve passages 14 by an operating stem 24, which is attached to one extremity of the valve member 18. The valve chamber 18, illustrated in FIGURE 1, is of a parallel expanding double wedge type and consists of a gate 21 to which the stem 24 is connected and a segment 23 which cooperates with the gate 21 for expanding the gate into tight sealing engagement with the seat members 22. The particular valve construction shown in FIGURE 1 is intended merely for purpose of illustration and is not intended as limiting in regard to this invention. Various other types of valves and other mechanical devices which are controlled by reciprocating stems may be controlled by a power operator as described in detail hereinbelow. A bonnet member 26 is fixed to the upper portion of the valve body 12 in any desired conventional manner to provide a sealed closure for the valve body 12 and includes a conventional packing assembly for the establishment of a fluid-tight seal between the valve stem and the bonnet. A yoke tube 34, fixed to or formed integral with the bonnet 26, is provided with a flange 36 at its upper extremity, which provides a support for an electrically energized power operator 38, fixed to the flange 36 by a series of bolts 40. For imparting movement to the power operator, a motor 42, which might be an electrically energized motor, a pneumatic motor, hydraulic motor, etc., is connected to housing 44 by a series of bolts 46. An operator control assembly housing 48 may be fixed to the operator housing 44 by a series of bolts 50 as illustrated in FIG. 1, or may be integral with the operator housing as illustrated in FIG. 4. The control assembly housing is provided with an inspection plate 52, which is removable for assembling and adjusting the control circuitry of the operator. Electrical power to operate and control the electrical devices is supplied from a remote control station through cable 43.

With reference now to FIGS. 2 and 3, a base portion 54 of the operator housing 44 is provided with an annular internal sleeve 56. The internal diameter of the sleeve 56 is enlarged at either end thereof defining internal bearing shoulders 58 and 60, against which are seated bearings 62 and 64, respectively. A tubular drive sleeve 66, having a worm gear 68 nonrotatably fixed adjacent one extremity thereof, is supported for rotation within the operator housing 48 by the bearings 62 and 64. A thrust support nut 70 is threadedly received on the drive sleeve 66 and is in engagement with the lower bearing 64 for preventing longitudinal movement of the drive sleeve 66 in one direction. A lock nut 72 is threadedly received on the drive sleeve 66 to lock the nut 70 against undesired rotation relative to the drive sleeve. A thrust support shoulder 74 defined by an enlarged diameter portion of the drive sleeve 66 engages the upper bearing 62 for supporting the drive sleeve 66 against longitudinal movement in the opposite direction. The worm gear 68 is keyed to the drive sleeve 66 and is maintained against a shoulder 76 on the drive sleeve 66, which provides thrust support therefor. The internal periphery of the drive sleeve 66 is provided with a series of internal splines 78 which mate with external splines 80, formed on a tubular drive shaft 82, to provide a nonrotatable support connection between the drive shaft and the drive sleeve. The drive shaft 82 is internally threaded at its lower extremity and receives the external threads 84 of the valve stem 24 for imparting longitudinal movement to the valve stem, as will be discussed in detail hereinbelow. A thrust support flange 86, formed integral with the drive shaft 82, is disposed between thrust bearings 88 and 90 which maintain the drive shaft 82 in rotatable connection with a spring retainer member 92. The spring retainer member 92 has an annular flange 94 formed at the lower extremity thereof for supporting the thrust bearing 90. A thrust nut 96 is threadedly received within the spring retainer 92 and is maintained in locked position by a lock nut 98 to provide a thrust support for the thrust bearing 88.

A spring retainer housing 99 is fixed to the operator housing 44 by a series of bolts 100 and has a base portion 102 thereof defining a lower support for a compression spring 104 of considerable compressive magnitude. An annular peripheral flange 106 formed on one extremity of the spring retainer member 92 forms a support shoulder against which the spring 104 is seated.

A latch mechanism including at least one latching detent 112 is fixed to the interior wall structure of the operator in any desired manner. The latching detent portion 112 is received within a recess 114 in the spring retainer member 92, for locking the spring retainer against movement with respect to the operator housing 44. The detent 112 is electrically moved into and held in locking engagement within the recess 114 against the bias of a return spring 116 by a solenoid 110, which may directly control the detent 112 as illustrated in FIGS. 2 and 3 or may remotely control the detent 112 through suitable mechanical linkage. Upon de-energization of the solenoid 110, for example by automatic or manual switch control or by failure of the electrical energy source supplying the solenoid, the spring 115 will withdraw the detent 112 from the detent 114, thereby allowing the compression spring 104 to move the spring retainer 92 to the fail-safe position illustrated in FIG. 3.

Figure 5:
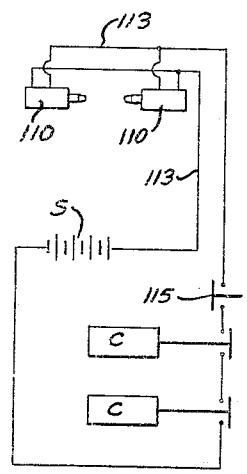
FIGURE 5 is a schematic illustration of the electrical control circuitry for the fail-safe mechanism.

As illustrated in FIG. 5, each of the solenoid energized latching detents 112 is provided with simple electrical circuitry 113, the energization of which may be controlled either manually, automatically, or by a manual trip switch 115. The switch 115 is normally biased to its closed position whereby the circuit is broken upon manual actuation of the switch. The solenoid 110 is normally continually energized from a power source of electrical energy against the bias of the springs 116. The solenoid latch control circuitry might also be controlled responsive to various predetermined conditions through one or more condition responsive switches C as desired. It is merely necessary that the circuit be maintained in an energized condition until such time as actuation of the fail-safe mechanism is desired. It is intended that the specific circuitry and control structure and the specific latching structure shown in the drawings be taken in an illustrative rather than limiting sense. Many suitable latching and latch control mechanisms might be effectively employed without departing from the spirit or scope of this invention.

Assuming that the valve 10 is in its open position when the gate member 18 is in its lowermost position, as illustrated in FIG. 1, and will be in its closed position when the gate 18 is moved to its uppermost position, fail-safe operation will occur as follows. With the fail-safe valve operator mechanism in its FIGURE 2 position, the compression spring 104 will be maintained under compression by the spring retainer 92 and the spring retainer will be locked with respect to the operator housing 48 by the latching detent 112. The spring retainer member 92, being in its lowermost position, will, through its connection with the splined drive shaft 82, maintain the valve stem 24 in its lowermost position, thereby maintaining the port 20 of the gate 18 in aligned relation with the flow passages 14 to permit the flow of fluid through the valve. Assuming now that the solenoid 112 is de-energized either automatically in response to conditions present within the operator, or manually under selective control of the operator circuitry at the control station, or inadvertently due to failure of the power source supplying the electrical control circuitry, the latching detent member 112 would be withdrawn by the return spring 116 out of its interlocking relationship with the recess 114 of the spring retainer 92. As the spring retainer 92 becomes unlocked, the compression spring 104 will expand, thereby forcing the spring retainer 92 to the position illustrated in FIG. 3. The drive shaft 82, being supported by the thrust bearings 88 and 90, will move upwardly with the spring retainer 92 and, through the threaded engagement with the valve stem 24, will move the valve stem longitudinally, thereby moving the gate 18 to its closed position.

It is seen, therefore, that de-energization of a solenoid 110 will cause automatic movement of the valve 18 to its closed position, thereby preventing any further flow of fluid through the valve. Although the valve illustrated in FIG. 1 is moved to its closed position by the fail-safe operator structure, it should be obvious that mere positioning of the valve port adjacent the lower extremity of the gate member would cause the valve to move to or remain at its open position when the fail-safe operation occurs.

As illustrated in FIG. 4, the operator housing 44 is provided with an internal bearing support boss 124, which is formed with a bearing aperture defining a bearing support shoulder 126 against which is positioned a bearing 128. A snap ring 130 retains the bearing 128 in engagement with the shoulder 126. A control shaft 132 is provided adjacent one extremity thereof with a thrust support shoulder 134 which engages the bearing 128 to prevent longitudinal movement of the shaft 132 in one direction. The other extremity of the control shaft extends through a bearing aperture 136 formed in the operator housing 44. A sealing ring 138 is fixed or otherwise retained within a recess in the housing 44 for the establishment of a fluid-tight seal between the control shaft and the operator housing. The power operator 38 is adapted for manual actuation by an extremity of the control shaft 32 which extends through the aperture 136 and which is provided with a nut 140 or the like for connecting a handwheel 142 to the shaft 132 as illustrated in FIG. 1.

A spur gear 144 is keyed to the shaft 132 and is retained in abutment with the bearing 128 by a lock nut 146. The spur gear 144 is disposed in interengaging connection with a spur gear 148 normally of different size. The spur gear 148 is keyed to the shaft 150 of the electric motor 42 and is retained thereon by a lock nut 152. The specific gear arrangement illustrated in FIG. 4 is intended as illustrative rather than limiting in regard to this invention. The specific gear size and arrangement will depend upon a number of design factors such as the force required to move the stem, the desired speed of valve operation, etc. Various other gear arrangements may be successfully employed without altering the spirit or scope of this invention.

For preventing damage to the power operator which could occur should excessive force be required to impart movement to the valve stem, a torque switch arrangement is operative to de-energize the motor 42 in the event excessive operative torque is encountered. The worm 69 is formed on a sleeve which is movably connected to the control shaft 132 by spline 133 and which is rotatably fixed to a torque sleeve 154 by a bearing 156. The bearing 156 is fixed to the worm 69 by a thrust support nut 158 and a lock nut 160 threadedly received at one extremity of the worm sleeve. A snap ring 162 retains the bearing 156 against longitudinal movement relative to the torque sleeve 154. A torque sleeve bracket 164 is disposed about the control shaft and is fixed to the internal wall structure 166 of the operator housing 44 in any desired manner. A stop plate 168 fixed within the bracket 164 is normally engaged by a stop nut 170 threadedly received on the torque sleeve 154 to provide a stop for limiting axial movement of the torque sleeve in one direction. A compression spring 172 is retained within a spring chamber 174 formed between the torque sleeve 154 and the bracket 164 and applies sufficient force to a support shoulder 176 through a support washer 178 and through stop plate 168 to stop nut 170 to maintain the torque sleeve 154 in balanced floating operating position as shown in FIG. 4.

A torque switch 180 is fixed to the internal wall structure of the operator housing 44 and is operative responsive to the development of excessive operating torque to cause de-energization of the electric motor 42 to prevent damage to the operator or motor. Excessive torques would normally be encountered if some foreign article were trapped in the valve bore while the gate was being moved to a closed position.

An arm 182 is pivotally attached intermediate its extremities to the wall structure of the operator housing 44 by a pivot 184 and has one end thereof exposed for operative engagement with a switch operating pin 186. The other extremity of the arm 182 is bifurcated and rests within a groove 188 in the worm sleeve 69.

During normal operation of the operator, the motor 42 through suitable gearing will impart rotation to the control shaft 132. The worm gear 69 being splined to the control shaft 132 will be rotated along with the control shaft and will impart rotary movement to the worm gear 68 for raising or lowering the valve stem 24 as desired. During this normal operation, the spring 172 will maintain the torque sleeve 154 in balanced floating position as illustrated in FIG. 4. If excessive torque is encountered during operation of the power operator, the force between the worm 69 and worm gear 68 will become greater thereby causing the worm 69 and torque sleeve 154 to be driven axially against the bias of the spring 172. Upon axial movement of the worm sleeve 69, the arm 182 resting within the groove 188 will be pivoted and hence through its engagement with the torque switch pin 186 will cause the torque switch 182 to de-energize the motor 42 to stop the operator. This torque control structure will effectively prevent damage to the power operator or the electric motor.

Upper and lower positioning of the gate of the valve may be preadjusted in a geared limit switch 190 for normal operation. The limit switch 190 is driven through suitable gearing such as illustrated in FIG. 4 by the control shaft 132.

With the spring retainer locked in its FIG. 2 position, the gate may be raised or lowered as desired merely by selective rotation of the mechanism driving the worm gear 69. The fail-safe mechanism will remain in its cocked condition until the solenoid 110 is de-energized. After the fail-safe mechanism has been released, the operator mechanism will be moved to its predetermined safe position regardless of the position of the valve stem 24. If the valve is in its FIG. 1 position, the gate will be moved upwardly to close the valve, as shown in FIG. 2. If the valve is already closed when the fail-safe mechanism is released, the spring retainer may be released but movement of the stem and gate will be prevented since the gate will be in stopping abutment with the bonnet 26. If the gate is being moved between its open and closed positions, the spring will only partially expand just sufficiently to cause movement of the gate to its closed position.

Upper and lower switches 120 and 122 are provided for engagement by the spring retainer 92 for indicating the position of the fail-safe mechanism at all times.

In any remote location, it is desirable and in any underwater location it is absolutely necessary to be able to reset the fail-safe spring in its compressed and latched position without local manual assistance. The normal open position from which the valve and fail-safe mechanism will move upon de-energization of the control circuitry is illustrated in FIG. 2. In the fail-safe closed condition illustrated in FIG. 3, the valve stem is in a normally closed position with the gate 21 stopped against the bonnet 26 and the operator motor controls and the limit switch 190 will remain in their "open position" setting. From this starting condition, the electric motor is energized to operate in the closed direction causing the worm 69, worm gear 68 and the tubular drive shaft 82 to rotate. Since the valve stem 24 is already in its uppermost position and is prevented by the bonnet stops from moving further upward, rotation of the tubular drive shaft 82, through its threaded interengagement with the stem 24, will cause a longitudinal translation of the drive shaft 82 downwardly on the stem. The drive shaft 82 will, through its rotatable connection with the retainer member 92, cause downward movement of the retainer member thereby compressing the fail-safe spring 104. When the drive shaft has moved downwardly sufficiently to position the groove 114 in the retainer 92 opposite the solenoid energized detent 112, the detent will move into interengagement with the groove thereby latching the fail-safe mechanism in a cocked position. At the same time the detent 112 enters the groove 114, the geared limit switch 190 will have completed its necessary rotational movement and will cause de-energization of the driving motor circuitry thereby stopping the operator and valve mechanism in the "closed" position. The valve may be opened and subsequently closed normally by controlling the direction of rotation of the reversible drive motor 42.

It is evident, therefore, that I have provided a power operator construction which is adapted responsive to specific predetermined conditions such as failure of operating power, selective or automatic control circuit de-energization, etc., for imparting longitudinal movement to a control stem for movement of the power operated device to a predetermined safety condition. For example, a valve may be moved to either its open or closed position as desired upon movement of the power operator construction to its failed position. The invention is specifically provided with a mechanical override construction for manual operation of the power operator while the operator is submerged. The invention is also provided with construction which is responsive to excessive torque for de-energizing the motor thereof to prevent damage to the power operator or the motor. The fail-safe operator structure is adapted to recompress the fail-safe spring and to latch it in its cocked position without use of any local manual assistance.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. An electrically energized fail-safe power operator for imparting longitudinal movement to the control stem of a mechanical device, said operator comprising a housing maintained against relative movement to the mechanical device, motor driven means fixed to the housing and adapted upon rotary movement thereof to impart longitudinal movement to the stem to control said mechanical device, a mechanical spring and spring retainer disposed within the housing and bearing rotatably connected to said motor drive means, electrically energized means retaining said spring and spring retainer in a compressed condition and adapted upon de-energization of said electrically energized means for releasing said spring and spring retainer.

2. An electrically energized fail-safe operator as set forth in claim 1; a rotary motor fixed to the housing, said motor driven means comprising a drive sleeve rotatably connected at one end thereof to the source of stored energy and being threadedly interengaged with said control stem at its other extremity, a drive bushing fixed for rotation within the housing and being telescopically received about the drive sleeve, said sleeve and bushing having longitudinal interengaging splines, thereby allowing relative longitudinal movement therebetween, means interconnecting the drive bushing with said motor whereby rotation of said motor through said drive sleeve and drive bushing interconnection imparts longitudinal movement to the operating stem.

3. An electrically energized fail-safe operator for imparting longitudinal movement to a control stem, said operator comprising a rotatable stem drive sleeve adapted for engagement with said control stem, means for rotating the drive sleeve, a retainer member, a source of stored energy for imparting longitudinal movement to the retainer member, said drive sleeve being rotatably secured to the retainer member, electrical control circuitry for said operator, means responsive to energization of said control circuitry for retaining the retainer member and drive shaft against longitudinal movement and responsive to de-energization of the control circuitry for allowing longitudinal movement of said retainer member and drive sleeve by said source of stored energy, a rotary motor adapted when energized to impart rotary movement to the drive sleeve and thereby induce longitudinal movement to the control stem.

4. An electrically energized fail-safe operator as set forth in claim 3, said means for rotating the drive sleeve comprising a drive bushing telescopically received about the drive sleeve, the drive sleeve and drive bushing having interengaging longitudinal splines whereby the drive bushing and drive sleeve are relatively movable only in longitudinal direction, said motor having a rotary shaft having a worm fixed thereto, a worm gear fixed to the drive bushing and interengaging with the worm, said drive sleeve being threadedly interengaged with said control stem whereby rotary movement of the worm by the motor imparts longitudinal movement to the control stem.

5. An electrically energized fail-safe operator as set forth in claim 3, said source of stored energy comprising a spring, a spring retainer adapted to maintain the spring under compression and being rotatably connected to said drive sleeve, a solenoid energized latch adapted when energized to lock the retainer in a position maintaining the spring under compression, electrical control circuitry for energizing the solenoid whereby upon de-energization of the control circuitry solenoid, the latch will release the spring retainer allowing the spring to expand thereby imparting longitudinal movement to the spring retainer, drive sleeve and control stem, said operator being remotely controllable for causing recompression of the spring and re-latching of said latch.

6. An electrically energized fail-safe power operator for imparting longitudinal controlling movement to the control stem of a mechanical device, said operator comprising a housing, a reversible rotary motor fixed to the housing, a shaft driven by said motor and having a worm fixed to one extremity thereof, a drive bushing disposed within the housing, a pair of bearings mounting said drive bushing for rotation within the housing, a worm gear fixed to the drive bushing and mating with said worm whereby rotation of said motor driven shaft imparts rotation to the drive bushing, a drive sleeve disposed within the drive bushing and having one extremity thereof in threaded interconnection with the control stem, said drive bushing and drive sleeve being interconnected for relative movement only in the longitudinal direction, a spring retainer member disposed within the housing and being rotatably interconnected with the other extremity of the drive sleeve, a compression spring disposed within the housing and being retained under compression by said retainer member, at least one electrically energized latch fixed within the housing and adapted when energized to interlockingly engage the retainer member, electrical control circuitry energizing said latch and adapted for de-energization either automatically responsive to predetermined operator conditions, manually or by damage to the electrical control circuitry, upon de-energization of said control circuitry said latch will release its locking engagement with said retainer allowing the spring to impart longitudinal movement to the retainer drive shaft and stem thereby moving the stem to its safe position.

7. An electrically energized fail-safe power operator as set forth in claim 6; said shaft extending outwardly of the housing in sealing relation therewith and having a drive nut fixed thereto, said drive nut adapted to receive a wrench or handwheel for manual operation of the shaft.

8. An electrically energized fail-safe operator as set forth in claim 1; a rotary motor, said electrically driven means comprising a drive sleeve rotatably connected at one end thereof to the source of stored energy and being threadedly interengaged with said control stem at its other extremity, a drive bushing fixed for rotation within the housing and being telescopically received about the drive sleeve, said sleeve and bushing having longitudinal interengaging splines, thereby allowing relative longitudinal movement therebetween, means interconnecting the drive bushing with said motor whereby rotation of said motor through said drive sleeve and drive bushing interconnection imparts longitudinal movement to the operating stem.

9. An electrically energized fail-safe power operator for imparting vertical movement to a control stem, said operator comprising an operator housing, a drive bushing mounted for rotation within said housing, a rotary motor fixed to the housing and adapted to impart rotary movement to said drive bushing, a drive shaft disposed within said housing in relatively movable relation with said drive bushing and being rotatably driven by said drive bushing, a fail-safe mechanism for said operator and including a retainer member, said retainer member being connected to said drive shaft, said fail-safe mechanism having a source of stored energy for imparting vertical movement to said retainer member to move said retainer, said shaft and said stem to a predetermined safe position, an electrical circuit for said fail-safe mechanism, said circuit being operative to retain said fail-safe mechanism at an initial position and being responsive to predetermined conditions to allow movement of said fail-safe mechanism to said safe position by said source of stored energy.

10. An electrically energized fail-safe power operator as set forth in claim 9, said fail-safe mechanism being remotely controllable for resetting the fail-safe mechanism and the control stem in the initial position.

11. An electrically energized fail-safe power operator as set forth in claim 9, said operator being provided with means for local manual operation of the power operator and control stem.

References Cited
UNITED STATES PATENTS

| | | | |
|---|---|---|---|
| 2,052,947 | 9/1936 | Shivers | 251—71 |
| 2,584,847 | 2/1952 | Dahl | 74—625 |
| 2,878,687 | 3/1959 | Kron et al. | 74—625 |

FRED C. MATTERN, JR., *Primary Examiner.*

W. S. RATLIFF, *Assistant Examiner.*